United States Patent [19]

Setzer et al.

[11] Patent Number: 4,522,802
[45] Date of Patent: Jun. 11, 1985

[54] STEAM REFORMING UTILIZING IRON OXIDE CATALYST

[75] Inventors: Herbert J. Setzer, Ellington; John A. S. Bett, Hamden; Roger R. Lesieur, Enfield, all of Conn.

[73] Assignee: United Technologies Corporation, Hartford, Conn.

[21] Appl. No.: 555,269

[22] Filed: Nov. 25, 1983

Related U.S. Application Data

[62] Division of Ser. No. 372,252, Apr. 26, 1982, Pat. No. 4,451,578.

[51] Int. Cl.³ .............................................. C01B 1/02
[52] U.S. Cl. .................................................. 423/652
[58] Field of Search ......................................... 423/652

[56] References Cited

U.S. PATENT DOCUMENTS

| | | | |
|---|---|---|---|
| 1,904,592 | 4/1933 | Young et al. | 423/652 |
| 3,340,011 | 9/1967 | Hoekstr et al. | 423/651 |
| 3,644,557 | 2/1972 | Senes et al. | 208/113 |
| 4,207,211 | 6/1980 | Russ et al. | 423/654 |

Primary Examiner—John Doll
Assistant Examiner—Wayne A. Langel
Attorney, Agent, or Firm—Harry J. Gwinnell

[57] ABSTRACT

High activity steam reforming iron oxide catalysts are described. Such catalysts can be unsupported utilizing at least 90% by weight iron oxide and various modifiers ($Al_2O_3$, $K_2O$, $CaO$, $SiO_2$) or unmodified and supported on such things as alumina, CaO impregnated alumina, and lanthanum stabilized alumina. When used in steam reformers such as autothermal and tubular steam reformers, these catalysts demonstrate much improved resistance to carbon plugging.

5 Claims, 2 Drawing Figures

4,522,802

STEAM REFORMING UTILIZING IRON OXIDE CATALYST

This is a division of application Ser. No. 372,252 filed on Apr. 26, 1982 now U.S. Pat. No. 4,451,578.

DESCRIPTION

1. Technical Field

The field of art to which this invention pertains is catalytic reforming of gaseous and/or liquid hydrocarbons utilizing the injection of steam to produce hydrogen.

2. Background Art

In the production of hydrogen, it is well known in the art to treat hydrocarbon material with a catalyst at high temperatures in the presence of steam. The hydrocarbon materials generally used are natural gas and naphtha which have been desulfurized to 0.1 part per million (ppm, by weight) sulfur. Hydrogen, carbon monoxide and carbon dioxide are the products of the reaction. These products are often cooled and passed over a shift conversion catalyst where the carbon monoxide is further reacted with steam to produce additional hydrogen and carbon dioxide.

Hydrogen generators and especially hydrogen generators for fuel cell powerplants may be required to operate with heavier fuels and, in the future, coal derived liquids. These heavier distillate fuels cannot readily be desulfurized to the 0.1 ppm sulfur level that is required for the conventional steam reforming process. Direct reforming of heavier fuels without desulfurization require higher temperatures to overcome the reduction in catalytic activity in the presence of sulfur. When the commercially available nickel steam reforming catalysts are used in this fashion, carbon deposition and reactor plugging occur and reactor operation cannot be sustained. The problem of carbon formation with conventional nickel catalysts can be overcome by adding air or oxygen to the hydrocarbon/steam fuel mixture. At oxygen to carbon ratios ($O_2/C$) equal to or greater than 0.42–0.46 carbon formation is eliminated with a 1380° F. (738° C.) preheat. In order to maximize the hydrogen production it is desirable to lower the oxygen to carbon ratio below 0.42. For example, for fuel cell powerplant applications, $O_2/C$ in the range of 0.35 are desirable.

Accordingly, what is needed in this art is a catalyst which is less susceptible to carbon formation and which in an autothermal reformer allows operation at reduced $O_2/C$ ratios.

DISCLOSURE OF INVENTION

The present invention is directed to a catalyst specifically adapted for use in autothermal and tubular steam reforming systems which substantially eliminates carbon plugging in such reforming systems and allows autothermal reformers to operate at reduced $O_2/C$ ratios with heavier distillate hydrocarbons such as No. 2 fuel oil. Such catalysts comprise stabilized iron oxide containing at least 90% by weight iron oxide and iron oxide supported on an alumina carrier. The alumina can optionally be lanthanum stabilized or calcium oxide impregnated.

Another aspect of the invention includes an autothermal reforming process utilizing the catalyst system according to the present invention.

Another aspect of this invention includes a tubular steam reforming process utilizing the catalyst system according to the present invention.

The foregoing, and other features and advantages of the present invention, will become more apparent from the following description and accompanying drawings.

BEST MODE FOR CARRYING OUT THE INVENTION

Figure 1:
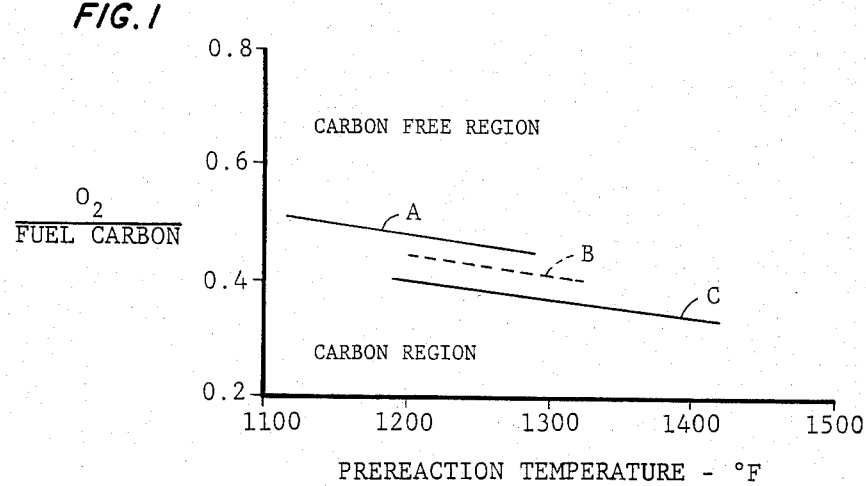
FIG. 1 shows regions of carbon-free steam reforming operation for various catalysts as a function of oxygen to fuel carbon ratios and reaction temperature.

The iron oxide catalysts according to the present invention can comprise either ferrous oxide or ferric oxide and in general (note the examples below) comprise a mixture of the two. If unsupported, the iron oxide contains promoters such as alumina, potassium oxide, calcium oxide and silicon dioxide in relatively small amounts, for example, up to about 2% by weight which can be added during catalyst preparation. In such instances, the iron oxide (FeO and $Fe_2O_3$) comprises at least 90% by weight of the catalyst. The supported iron oxide is generally impregnated into the alumina substrate out of aqueous solution. The supported iron oxide comprises from about 10% to about 90% by weight of the catalyst plus substrate according to the present invention, and preferably comprises about 20% to about 30% by weight. Although the supported iron oxide can contain promoters or modifiers, typically it does not.

As the substrate material, either $Al_2O_3$, a lanthanum stabilized alumina or a calcium oxide impregnated alumina can be used. Although the $Al_2O_3$ pellets are sized depending on reactor size and other system variables, they are typically about 0.125 inch (0.318 cm) in diameter with an average length of about 0.14 inch (0.356 cm) and are available commercially from Harshaw Chemical Co., Cleveland, Ohio (designated Al-4104E). The lanthanum stabilized alumina substrate is a commercially available catalyst support material available from W. R. Grace & Co. (e.g. Grace SRDX-1/79-1). The calcium oxide containing alumina is prepared by impregnating the alumina with a solution (preferably aqueous) of a calcium salt (preferably calcium nitrate) followed by drying to remove the solvent, and calcining in air to oxidize the deposited salt to calcium oxide. Calcining temperatures may vary depending on the particular salt used, but generally temperatures of about 1850° F. (1010° C.) are used, e.g. for calcium nitrate. Enough calcium salt is deposited on the support material such that after calcining about 10% to about 35% calcium is present in the support material, and preferably about 15% by weight.

The iron oxide catalyst material according to the present invention is deposited on the substrate material by any conventional method in this art, and as stated above, preferably out of aqueous solution. Metal salts and typically the nitrates are dissolved in either aqueous or organic solvents and dried on the substrate. The deposited salts are then calcined to form the oxides.

EXAMPLE 1

Steam reforming catalysts according to the present invention were prepared as follows: 5 grams of extruded $Al_2O_3$ pellets having a diameter of 0.125 inch (0.318 cm) and an average length of 0.14 inch (0.356 cm) (available from Harshaw Chemical Co., Cleveland, Ohio designated as Al-4104E) were impregnated with 7.5 ml of an aqueous solution which contained 1.2 gm $Fe(NO_3)_3.9H_2O$ per ml of solution. The impregnated material was then placed in an ultrasonic blender for 5 minutes. The material was removed from the ultrasonic blender, allowed to stand for ½ hour at room temperature, dried for 1½ hours at 300° F. (149° C.), and calcined overnight at 1860° F. (1016° C.).

EXAMPLE 2

Iron oxide on lanthanum stabilized alumina was prepared as follows: 1713 grams of $Fe(NO_3)_3.9H_2O$ were dissolved in 212 ml of water. This solution was used to impregnate pellets of a lanthanum stabilized alumina substrate, commercially available from W. R. Grace Corporation (Davison Division) under the designation SRDX-1/79-1. The pellets were sized similar to those of Example 1. The mixture was placed in an ultrasonic blender for 5 minutes, allowed to stand for 30 minutes and the excess solution was decanted. The catalyst was dried at 270° F. (132° C.) for 3.5 hours and then calcined at 1502° F. (817° C.) for 16 hours. The finished product weighed 980 grams.

EXAMPLE 3

A steam reforming catalyst of iron oxide on CaO containing $Al_2O_3$ was prepared as follows:

A solution consisting of 600 grams of $Ca(NO_3)_2.4H_2O$ dissolved in 177 ml of $H_2O$ was used to impregnate 365 grams of $Al_2O_3$ pellets as described in Example 1 (Harshaw Al-4104E). The impregnated material was placed in an ultrasonic blender for 5 minutes and then allowed to stand for 30 minutes. The excess solution was then decanted, dried at 300° F. (149° C.) for 1½ hours and calcined at 1850° F. (1010° C.) for 16 hours. This product weighed 426 grams. This material was then impregnated with a solution consisting of 425 grams of $Fe(NO_3)_3.9H_2O$ dissolved in 47 ml of $H_2O$. The material was placed in an ultrasonic blender for 5 minutes, allowed to stand for 30 minutes and then excess solution was decanted. The catalyst was dried at 290° F. (143° C.) for 3 hours and calcined at 1830° F. (999° C.) for 16 hours. The impregnating with $Fe(NO_3)_3.9H_2O$, blending, drying and calcining was then repeated.

EXAMPLE 4

An unsupported, stabilized iron oxide catalyst designed for ammonia synthesis was purchased from Katalco Corporation of Oak Brook, Ill. This material was purchased with the designation Katalco 35-4 and had the following chemical composition (percent by weight):

| | |
|---|---|
| FeO | 24.5 |
| $Fe_2O_3$ | 69.1 |
| Free Fe | nil |
| Total Fe | 93.6 |
| $Al_2O_3$ | 2.5 |
| $K_2O$ | 0.8 |
| CaO | 2.0 |
| $SiO_2$ | 0.4 |
| P | Trace |
| S as $SO_3$ | Trace |
| Chloride | <10 ppm |
| Fe/Fe | 0.41 |
| Other minor impurities | Traces V and Ti |

An example of the improved performance of catalysts according to the present invention is shown in FIG. 1 where A is a commercial nickel catalyst (25% by weight nickel on an α-alumina support material); B is the CaO on $Al_2O_3$ of Example 3; and C is iron oxide on CaO impregnated $Al_2O_3$ of Example 3 and D the unsupported catalyst of Example 4.

Testing was performed in an autothermal reformer 2 inches (5.08 cm) in diameter and about 24 inches (60.96 cm) long. Heat was provided by internal combustion of the fuel and air. No. 2 fuel oil was used as the fuel. It can be seen that not only is there a reduction in carbon formation on the catalyst material using the No. 2 fuel oil, but the oxygen to fuel level can be kept significantly lower than the coventional nickel catalysts and even other oxides resulting in improved quality of hydrogen produced and increase in reforming efficiency.

In the Table, another demonstration of the improved performance catalysts of the present invention provide over conventional nickel catalysts is shown. Testing was performed under tubular steam reforming conditions using an electrically heated tubular steam reformer 1.25 inches (3.18 cm) in diameter and 5 feet (152.4 cm) long, with an inlet temperature of about 950° F. (510° C.) and an outlet temperature of about 1675° F. (913° C.) using No. 2 fuel oil as the fuel. Pressure drop (indicating a decrease in efficiency) was measured as a function of time as indicated.

TABLE

| Catalyst | Increase in the Pressure Drop | Time - Hours |
|---|---|---|
| Nickel on Calcium Aluminate | 9 psig | 15 hours |
| Iron oxide on $CaO/Al_2O_3$ | 0 psig | 100 hours |
| Iron oxide on Lanthanum Stabilized Alumina | 0 psig | 100 hours |

Figure 2:
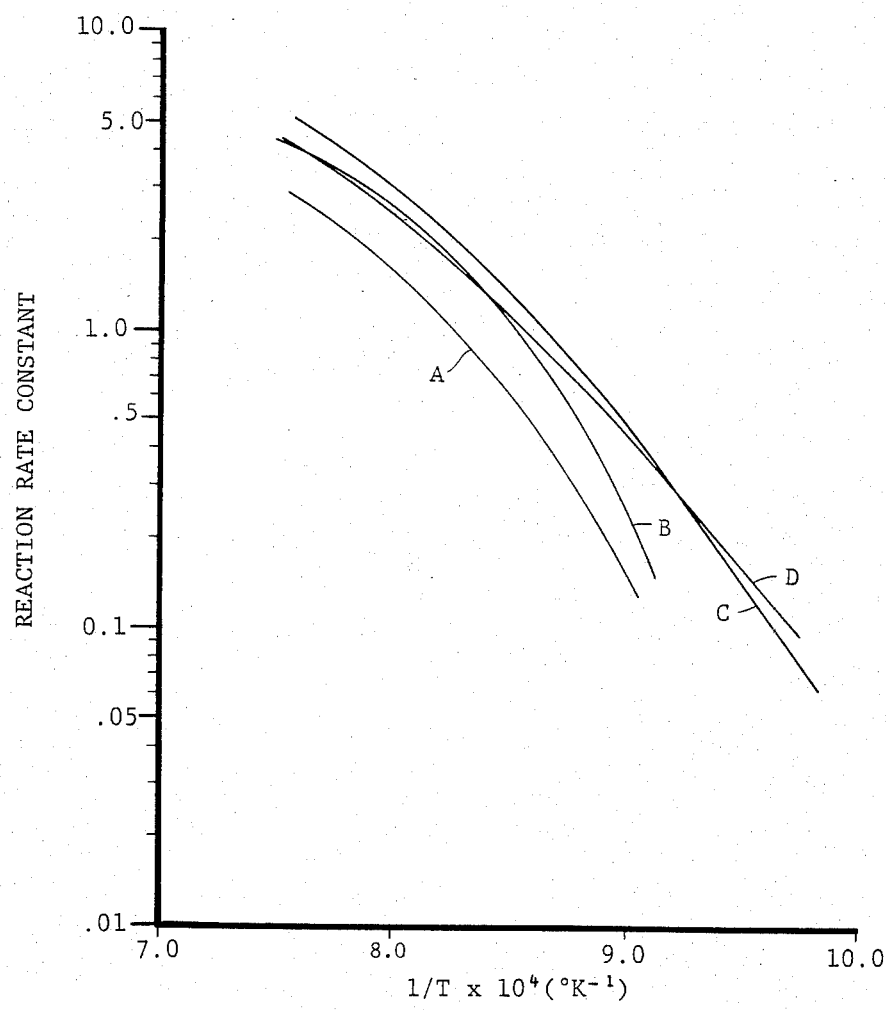
FIG. 2 shows activity of catalyst material according to the present invention as a function of temperature.

FIG. 2 also shows the improved performance characteristics of catalysts according to the present invention where D is the unsupported iron oxide of Example 4; C is the iron oxide on CaO impregnated alumina of Example 3; E is the iron oxide on untreated alumina; and F is the iron oxide on lanthanum stabilized alumina of Example 2.

The reactants were steam reformed in an isothermal tubular steam microreformer 0.305 inch (0.775 cm) inner diameter containing 1 inch (2.54 cm) in length, or 0.5 gram, of catalyst material. Ethane containing 2,225 parts per million by weight $H_2S$ (at about 1 atmosphere pressure) was used as the fuel.

In the Figure, the data for catalysts is shown on a conventional Arrhenius Graph. In this graph, the reaction rate constant (k) is plotted against the reciprocal of the absolute test temperature. The reaction rate constant (k) (synonymous with activity) is defined by the pseudo-first order rate equation:

$$k = (\text{space velocity}) \times \ln\left(\frac{1}{1 - \frac{\% \text{ conversion}}{100}}\right)$$

In previous testing with $Al_2O_3$ pellets (Harshaw Al-4104E) visual inspection of the microreactor catalyst showed carbon formation in the catalyst bed. However, addition of iron oxide according to the present invention to this same alumina substantially eliminated such carbon formation. With the $Al_2O_3$ pellets the carbon deposited was of sufficient magnitude to form a matrix which encapsulated the alumina particles and resulted in a large aggregate of many alumina particles encased in carbon. When the $Al_2O_3$ pellets contained iron oxide as in the Examples, no carbon was found in the catalyst bed. Visual inspection of the (Katalco 35-4) iron oxide on the lanthanum stabilized alumina and iron oxide on the CaO impregnated $Al_2O_3$ also showed no carbon formation.

Types of reformers in which the catalysts according to the present invention demonstrate the improved resistance to carbon formation are tubular reformers, autothermal reformers, adiabatic reformers and cyclic reformers. The primary difference between these reformers is the manner in which heat is supplied for the endothermic reforming reaction. In the tubular reformer, the heat is supplied through the walls of a cylinder to the catalyst material. Note commonly assigned U.S. Pat. No. 4,098,589, the disclosure of which is incorporated by reference. In the autothermal reformer, the heat is supplied to the catalyst bed directly by the heated gases entering and combusting in the reformer. Note commonly assigned U.S. Pat. No. 3,967,507, the disclosure of which is incorporated by reference.

In the cyclic reformer, a plurality of reformers are operated simultaneously with one set of reformers operating under a combustion phase (reacting fuel and air) to provide the necessary heat for the hydrogen production phase and the other set of reformers operating under the hydrogen production phase (reacting hydrocarbon and steam), with a switching of phases when the temperature of the reformers in the hydrocarbon production phase drops below that necessary to sustain hydrogen production. Note commonly assigned U.S. Pat. No. 4,293,315, the disclosure of which is incorporated by reference. In the adiabatic reformer, a conventional heat exchanger is utilized to supply the requisite heat to the steam and hydrocarbon prior to passage into the steam reformer.

As stated above, in the autothermal reforming process fuel, steam and preheated air are mixed and passed over the catalyst bed. The air is added to the reactants to raise the temperature of the reactants and supply the endothermic heat for reaction. In order to operate efficiently, the quantity of air added must be kept to a minimum. A representative ratio of oxygen to carbon in the hydrocarbon is 0.35 to 1 at 1360° F. (738° C.) (note the Figure) significantly lower than the 0.42–0.46 using commercial nickel catalysts. This tends to lower reaction temperature and increase the activity of the catalysts used in this environment. At operating temperatures, conventional steam reforming catalysts such as nickel on alpha alumina are deficient in activity.

While the iron oxide catalysts according to the present invention can be used alone, a particularly attractive arrangement for the autothermal reformer includes the use of only an inlet portion of iron oxide catalyst according to the present invention in such reformer. In this inlet region, all the oxygen reacts with the hydrocarbon and temperatures increase very rapidly. Downstream of this region, the reactor is loaded with high activity nickel or rhodium catalysts as described in commonly assigned copending application Ser. No. 333,841, filed Dec. 23, 1981, the disclosure of which is incorporated by reference. In this latter region, hydrocarbons and reaction intermediates react with steam. Due to the endothermic nature of the reaction with steam, temperatures drop, and it is important to have a high activity catalyst in this region. Typical ratios for such multi-catalyst system are one-third of the reactor length comprising the iron oxide catalyst of the present invention and two-thirds of the reactor length comprising the high activity nickel or rhodium described above. The use of such a multiple catalyst system allows greater flexibility in the maximum allowable reactor temperature and the method of introducing the air into the reactor.

Although the present invention has been described specifically in terms of autothermal and tubular steam reformers, it would be obvious to one skilled in this art that such systems could be used in the other types of steam reformers mentioned above as well. Furthermore, although the entire range of useful fuels has not been run through the catalyst systems according to the present invention, based on the reactions involved, it is felt that natural gas or any hydrocarbon fuel with a boiling point as high as No. 2 fuel oil is useful with the catalyst of the present invention. Furthermore, the catalysts according to the present invention are useful with any system where carbon formation is a problem such as oxidation reactions, gasification of heavy fuels, steam cracking as in ethylene production, etc. It should also be noted that while the iron oxide catalyst systems have been described as preferably supported, one may use such systems unsupported (e.g. the Katalco 35-4 iron oxide catalyst) in steam reforming processes according to the present invention if one is willing to suffer the lessened performance shown above (e.g. note FIG. 2). And while this invention has been described in terms of alumina, calcium oxide impregnated alumina and lanthanum stabilized alumina catalyst carrier material, it is possible that similar improved results are obtainable with other promoted alumina carrier material such as magnesium oxide, magnesia and titania promoters or magnesia and titania carrier material containing no alumina as well.

Although this invention has been shown and described with respect to detailed embodiments thereof, it will be understood by those skilled in the art that various changes in form and detail thereof may be made without departing from the spirit and scope of the claimed invention.

We claim:

1. In an autothermal steam reforming process including passing a mixture of hydrocarbon fuel, steam and preheated air over a catalyst bed to form hydrogen, wherein the improvement comprises using as the catalyst material iron oxide deposited on a lanthanum stabilized alumina substrate, the iron oxied comprising about 20% to about 30% by weight, to substantially eliminate carbon plugging in such reforming systems and allow operation of the reforming process at reduced oxygen to carbon ratios with heavier distillate hydrocarbons such as No. 2 fuel oil.

2. In a tubular steam reforming process including passing a mixture of hydrocarbon fuel, steam and air over a catalyst bed contained in a cylindrical vessel and supplying heat to the catalyst bed through the vessel walls, wherein the improvement comprises using as the catalyst material iron oxide deposited on a lanthanum stabilized alumina substrate, the iron oxide comprising about 20% to about 30% by weight, to substatially eliminate carbon plugging in such reforming system and allow operation of the reforming process at reduced oxygen to carbon ratios with heavier distillate hydrocarbons such as No. 2 fuel oil.

3. The process of claim 1 where the alumina substrate is calcium oxide impregnated.

4. The process of claim 2 where the alumina substrate is calcium oxide impregnated.

5. The process of claims 1 or 2 where the substrate is in the form of pellets.

* * * * *